US008085805B2

(12) United States Patent
Yang et al.

(10) Patent No.: US 8,085,805 B2
(45) Date of Patent: Dec. 27, 2011

(54) ADAPTIVE CHANNEL SELECTION BY WIRELESS NODES FOR IMPROVED OPERATING RANGE

(75) Inventors: Yifeng Yang, Chandler, AZ (US); Steven Bible, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 583 days.

(21) Appl. No.: 12/253,322

(22) Filed: Oct. 17, 2008

(65) Prior Publication Data

US 2010/0098001 A1 Apr. 22, 2010

(51) Int. Cl.
*H04L 12/28* (2006.01)
(52) U.S. Cl. ........ 370/431; 370/310; 370/343; 370/344; 370/437
(58) Field of Classification Search .................. 370/310, 370/343–344, 431, 437
See application file for complete search history.

(56) References Cited

U.S. PATENT DOCUMENTS

| 2004/0165612 | A1* | 8/2004 | Backes et al. ................. 370/431 |
| 2005/0085190 | A1 | 4/2005 | Nishikawa ................... 455/63.1 |
| 2006/0079230 | A1* | 4/2006 | Russell .......................... 455/434 |
| 2007/0220571 | A1* | 9/2007 | Feng et al. ..................... 725/111 |
| 2008/0080463 | A1* | 4/2008 | Stewart et al. ................ 370/342 |
| 2008/0102845 | A1 | 5/2008 | Zhao ............................. 455/450 |
| 2008/0144524 | A1 | 6/2008 | Hershey et al. ............... 370/254 |

FOREIGN PATENT DOCUMENTS

EP 1 650 901 A1 4/2006

OTHER PUBLICATIONS

Perkins et al. Ad hoc On-Demand Distance Vector (AODV) Routing. The Internet Society. Network Working Group. RFC 3561. Jul. 2003.*
International PCT Search Report and Written Opinion, PCT/US2009/060790, 14 pages, Mailed Feb. 23, 2010.

* cited by examiner

*Primary Examiner* — Hassan Kizou
*Assistant Examiner* — Ashil Farahmand
(74) *Attorney, Agent, or Firm* — King & Spalding L.L.P.

(57) ABSTRACT

Improved message range in a wireless network is achieved by each node performing an energy/noise scan to determine a receiving channel having the lowest noise and/or interference, e.g., best reception conditions, relative to the other channels available in the wireless network. Each node may thereafter scan available channels periodically to adjust its optimal receiving channel if the noise/interference environment changes on its present receiving channel, e.g., noise/interference on another channel is less then the noise on the present receiving channel. When a receiving channel is changed by a node, the wireless node may broadcast this information to notify its neighbor nodes of the change in its receiving channel.

5 Claims, 7 Drawing Sheets

FIGURE 1
(Prior Technology)

ADAPTIVE CHANNEL SELECTION BY WIRELESS NODES FOR IMPROVED OPERATING RANGE

TECHNICAL FIELD

The present disclosure relates to wireless networks, and more particularly, to wireless nodes having adaptive channel selection to improve operating range thereof.

BACKGROUND

A node is a term used in digital communications and networking to denote a point in a network at which lines intersect or branch, a device attached to a network, or a terminal or other point in a computer network where messages can be transmitted, received or forwarded. A node can be any device connected to a computer network. Nodes can be computers, personal digital assistants (PDAs), cell phones, switches, routers or various other networked devices. In the case of a wireless network, the nodes use transceivers (receivers and transmitters) operating at microwave frequencies, e.g., 2.4 GHz ISM band and the like.

A successful transmission of a message(s) between wireless nodes having predefined output power is generally determined by the noise level at the receiving node, e.g., destination node. A lower noise level at the receiving node has the same effect as increasing the sensitivity of the receiving node and/or increasing the transmit power from a transmitting node, e.g., origination node, in communications with the receiving node. The popularity of digital wireless communications, e.g., Wi-Fi, BLUETOOTH® (a registered trademark of Bluetooth SIG, Inc., 500 108th Avenue NE, Suite 250, Bellevue WASHINGTON 98004), ZIGBEE® (a registered trademark of ZigBee Alliance CORPORATION CALIFORNIA, 2400 Camino Ramon, Suite 375, San Ramon, Calif. 94583), etc., has created much interference, for example but not limited to, in the crowded 2.4 GHz ISM band. This interference in effect increases the noise floor and degrades reliable reception by the receiving node.

Figure 1:
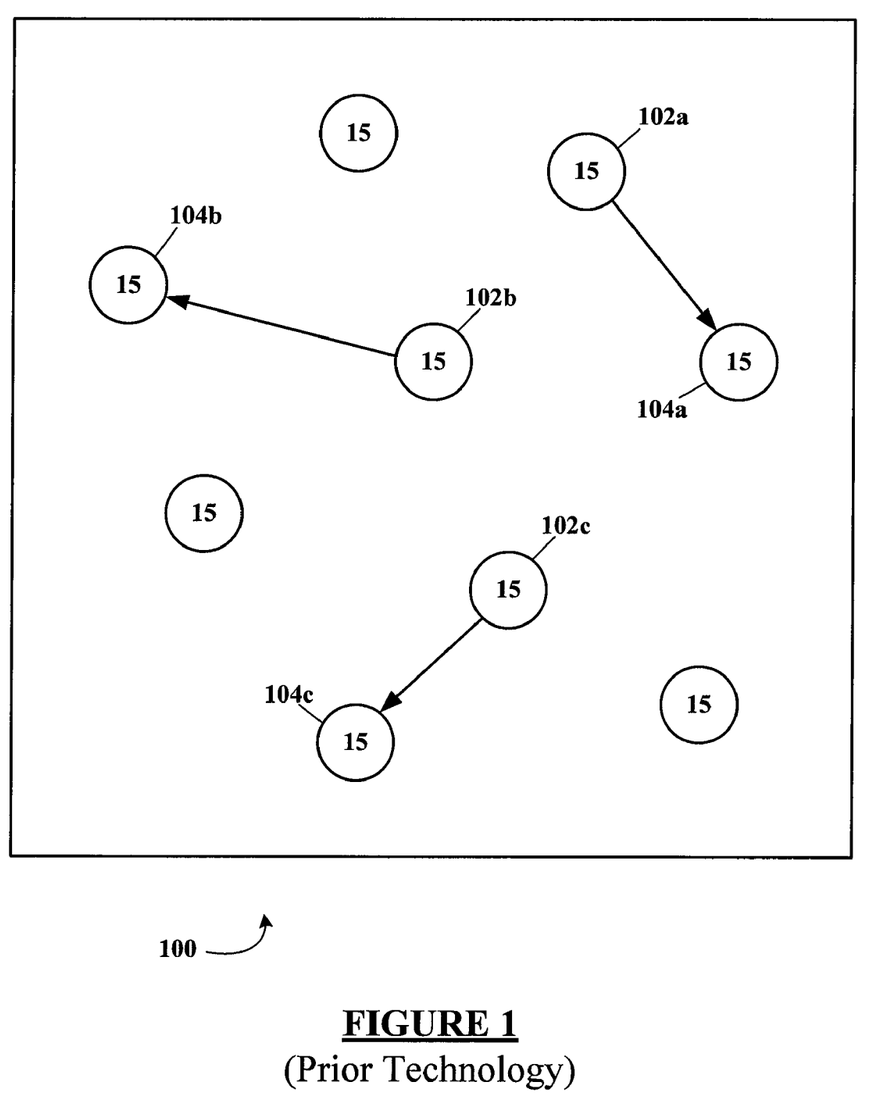
FIG. 1 is a schematic spatial distribution diagram of a typical prior technology wireless network's nodes using a common operating channel for both receiving and transmitting at each node.

Referring to FIG. 1, depicted is a traditional wireless network that uses one channel (frequency) to communicate between wireless nodes, i.e., all nodes talk to one another on the same channel. In this example, channel 15 is used for communications between wireless nodes. As the network grows in size (area and number of nodes), the noise level increases or decreases for each receiving node depending on its location and the interference that it is subjected to by interference sources, e.g., WiFi, Bluetooth, etc., transmitting on the same channel. It is desirable to find a channel (frequency) that has the least amount of interference and noise so that receiving (destination) nodes perform optimally. It is highly unlikely that there is a single channel (frequency) that is the optimum for all nodes communicating in a wireless network.

SUMMARY

Therefore, a need exists to optimize node reception by finding frequencies (channels) having minimum background noise at each node of a wireless network and using same for communicating between nodes, thereby improving data signal transmission error rates and increasing usable distances between the communicating nodes.

Optimal receiving frequencies (channels) for the wireless nodes have minimal noise power at the selected node receiving frequencies, taking into account the spatial relationships of the wireless nodes with each other. Therefore, every node can receive signals on an optimum minimum noise frequency (channel) and thereby have much improved performance over a traditional wireless network that communicates on only one channel regardless of noise present at the location of each of the nodes.

According to the teachings of this disclosure, each node performs an energy/noise scan to determine a receiving channel having the lowest noise and/or interference, e.g., best reception conditions, relative to the other channels. Each node may thereafter scan available channels periodically to adjust its optimum receiving channel if the noise/interference environment changes on its present receiving channel, e.g., noise/interference on another channel is less then the noise/interference on the present receiving channel. When a receiving channel is changed by a node, the wireless node may broadcast this information to notify its neighbor nodes of the change in its receiving channel.

Every wireless node stores the receiving channels of all of its neighbor nodes that a message may be sent. When broadcasting a message, the origination node sends the message on all available channels. Broadcasting is where information is sent from one point to all other points, e.g., one origination node transmits information to all nodes having the ability to communicate with the origination node.

When unicasting a message, the origination node will switch to the known receiving channel of the destination node and then transmit the message. Unicasting is when a communication is sent from one point to another point, e.g., one origination node and one destination node. The message may include the receiving channel of the origination node for the destination node to respond on the receiving channel of the origination node. After the message is delivered, the origination node will switch back to its operating receiving channel to receive a possible response from the destination node. In case the response is not received in a predefined time, the message will be repeated until a predefined number of tries has been reached, then a time out error may be sent to the software layers above.

If the designated number of tries in trying to send a message have failed, then the origination node needs to resynchronize with the destination node by acquiring the destination node's current receiving channel. The origination node will try to send out a resynchronization command to the intended destination node on all channels. If the destination node responds to the resynchronization command on a different channel other then the current known (stored) receiving channel for that node, then that different channel is updated as the new receiving channel of that node and another unicast transmission is performed thereto. If the resynchronization is not successful, the transmission will be labeled a failure and the software application will be notified.

After the destination node receives the broadcast message, the destination node will notify the device upper layer(s) to process the received message. Upon receiving a unicast message, if a response is not required, the destination node will notify the upper layer to process the message. If a response is required, then destination node will switch to the origination node's receiving channel and send out the response before switching back to the destination node's receiving channel for reception of the next message.

Thus each and every individual node receives messages on the channel with the least noise and/or interference at its local environment and adjusts the receiving channel (frequency) if necessary when the local noise/interference environment changes without affecting the whole wireless network. As a result, receiving noise/interference is effectively lowered at every one of the nodes working in the wireless network to achieve better range and/or reliability of message delivery.

According to a specific example embodiment of this disclosure, a wireless network having a plurality of nodes with adaptive channel selection for improved communications range therebetween comprises: a plurality of wireless nodes, each of the plurality of wireless nodes capable of being an origination node or a destination node; and each of the plurality of wireless nodes has a receiving channel selected for best reception at a location of that node; wherein the origination node sends a message on the receiving channel of the destination node.

According to another specific example embodiment of this disclosure, a method for improving communications range between a plurality of nodes comprises the steps of: scanning receiving channels available to a plurality of nodes; selecting a receiving channel having a best reception for each one of the plurality of nodes; and storing each of the selected receiving channels in respective ones of the plurality of nodes.

BRIEF DESCRIPTION OF THE DRAWINGS

A more complete understanding of the present disclosure may be acquired by referring to the following description taken in conjunction with the accompanying drawings wherein.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawing, the details of specific example embodiments are schematically illustrated. Like elements in the drawings will be represented by like numbers, and similar elements will be represented by like numbers with a different lower case letter suffix.

Referring to FIG. 1, depicted is a schematic spatial distribution diagram of a typical prior technology wireless network's nodes using a common operating channel for both receiving and transmitting at each node. A typical prior technology wireless network, generally represented by the numeral 100, uses one channel (frequency) to communicate between wireless nodes, i.e., all nodes talk to one another on the same channel. In this example, channel 15 is used for communications between wireless nodes, i.e., origination node 102 transmits and destination node 104 receives packets of data. As the network grows in size (area and number of nodes), the receiving noise level increases or decreases for each destination node depending on its location in the network and the noise/interference it is subjected to by other electronic devices and/or neighboring nodes transmitting on the same channel.

Figure 2:
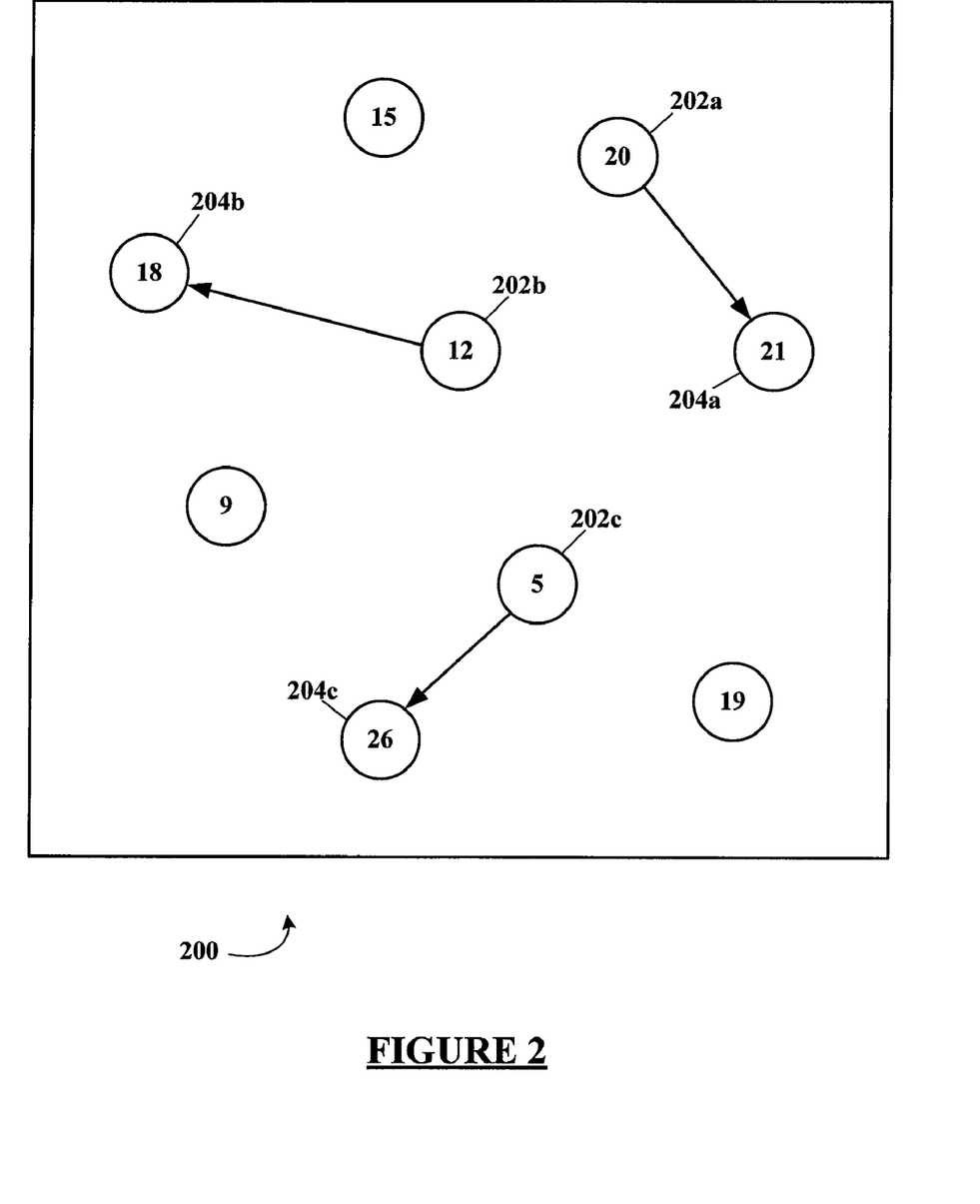
FIG. 2 is a schematic spatial distribution diagram of a wireless network's nodes using receiving channels selected for minimum receiving noise at each of the destination nodes, according to a specific example embodiment of this disclosure.

Referring to FIG. 2, depicted is a schematic spatial distribution diagram of a wireless network's nodes using receiving channels selected for minimum reception noise at each of the destination nodes, according to a specific example embodiment of this disclosure. A wireless network, generally represented by the numeral 200, comprises a plurality of nodes, e.g., origination nodes 202, and destination nodes 204 whose receiving channels are selected for minimum noise/interference on a receiving channel at each location of a destination node 204. Optimal receiving frequencies (channels) for the wireless nodes 204 have minimal noise/interference power at the selected node frequencies, e.g., noise/interference generated from the spatial relationships of the wireless nodes 202 and 204 with each other, noise/interference generated from other electronic devices, etc. Therefore, every destination node 204 may receive signals (e.g., data packets) from an origination node 202 on an optimum minimum noise frequency (channel) and thereby have much improved performance over a traditional wireless network that communicates on only one signal channel irregardless of noise/interference present at the location of the destination node 204.

Figure 3:
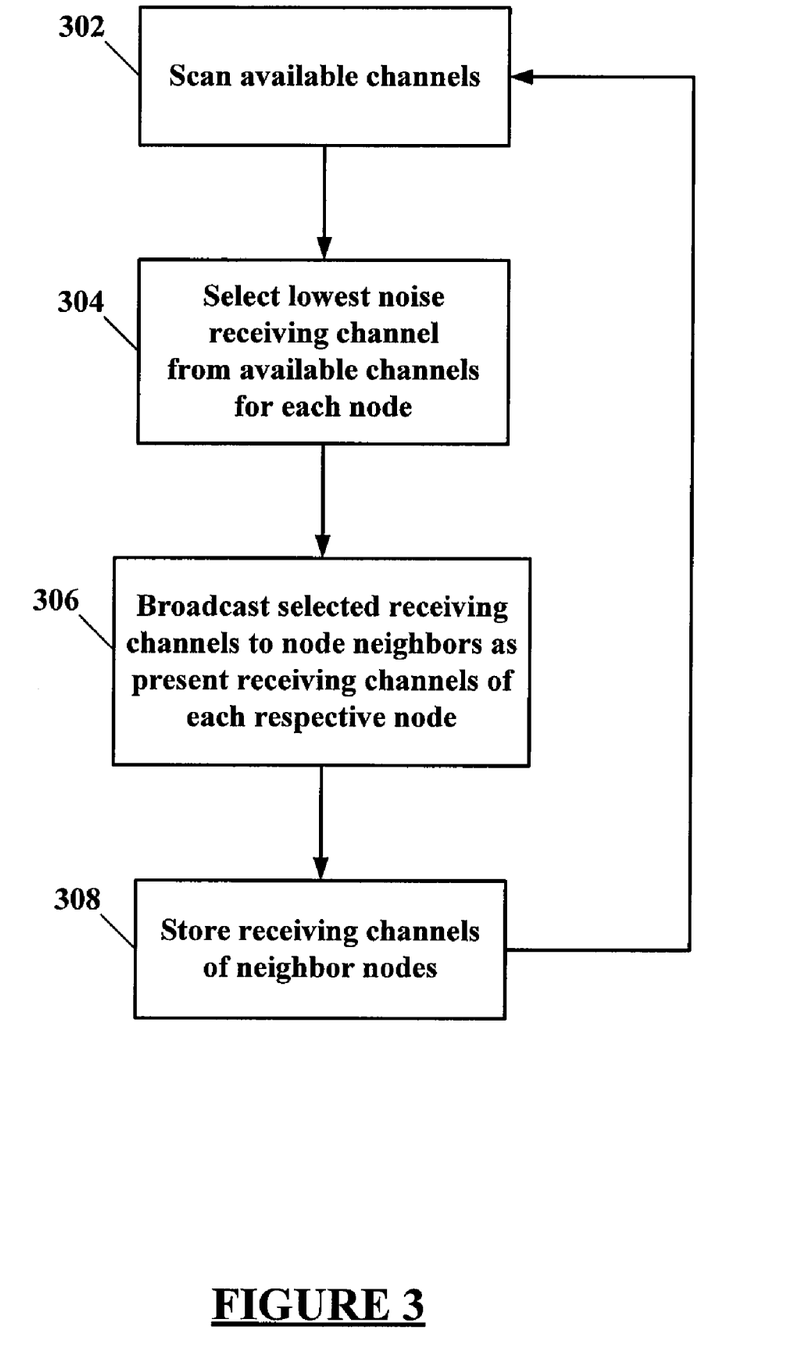
FIG. 3 is a schematic flow diagram for determining an optimal receiving channel for each node, according to the teachings of this disclosure.

Referring to FIG. 3, depicted is a schematic flow diagram for determining an optimal receiving channel for each node, according to the teachings of this disclosure. In step 302 each node scans all available channels in determining a receiving channel having the lowest noise/interference. In step 304 the lowest noise receiving channel is selected (and stored in the node) as that node's receiving channel from the available receiving channels. Then in step 306 the receiving channel selected in step 304 for each node is broadcast to all of the neighbor nodes. In step 308 each node stores the receiving channels of its neighbor nodes.

Figure 4:
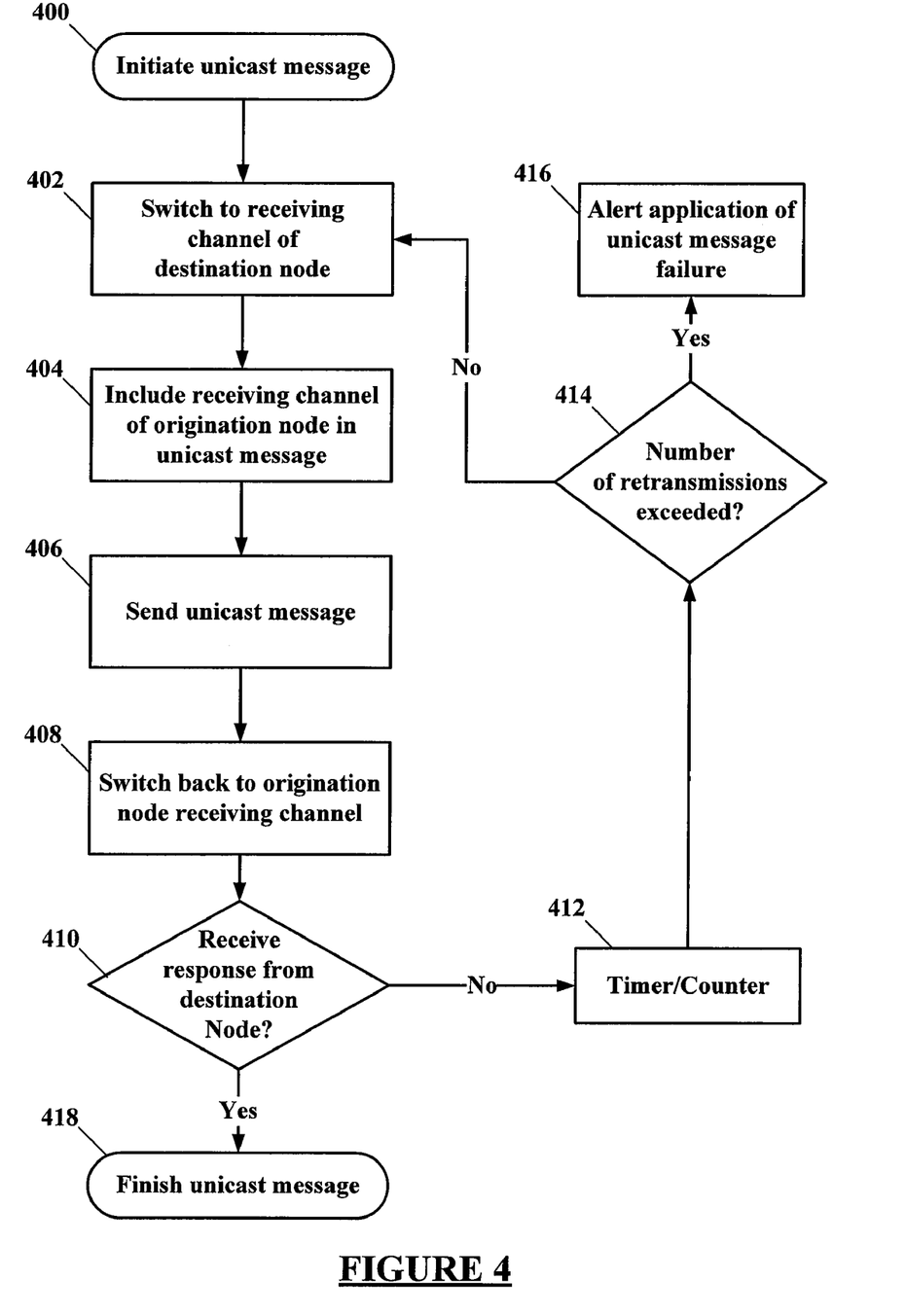
FIG. 4 is a schematic flow diagram for transmitting a unicast message, according to the teachings of this disclosure.

Referring to FIG. 4, depicted is a schematic flow diagram for transmitting a unicast message, according to the teachings of this disclosure. Unicasting is when a communication is sent from one point to another point, e.g., one origination node sends a message, e.g., a plurality of data packets, to one destination node. A unicast message is initiated in Step 400. In step 402 the message origination (transmitting) node switches to the receiving channel of the intended destination node. In step 404 the receiving channel of the origination node is included in the unicast message to be sent so that the destination node can respond to the origination node at its optimal receiving channel of the reception of the unicast message. In step 406 the unicast message is sent by the origination node. Then in step 408 the origination node switches back to its receiving channel in anticipation of receiving the expected response sent from the destination node. Step 410 determines whether the response from the destination node is received by the origination node, if so, then in step 418 the unicast message is finished.

If a response is received in step 410 then a unicast message is complete. If a response is not received in step 410 within a certain time determined in step 412, then the message repeat counter in step 412 has reached its limit in step 414, and a message failure alert is sent to the application in step 416. If a certain number of retransmissions has not been exceed then transmit the unicast message as discussed hereinabove for steps 402-408.

If responses from the destination node are not required for respective message packets sent by the origination node, then the origination node just sends the message as time sequential packets and then switches back to its receiving channel between message packets, e.g., User Datagram Protocol (UDP).

Figure 5:
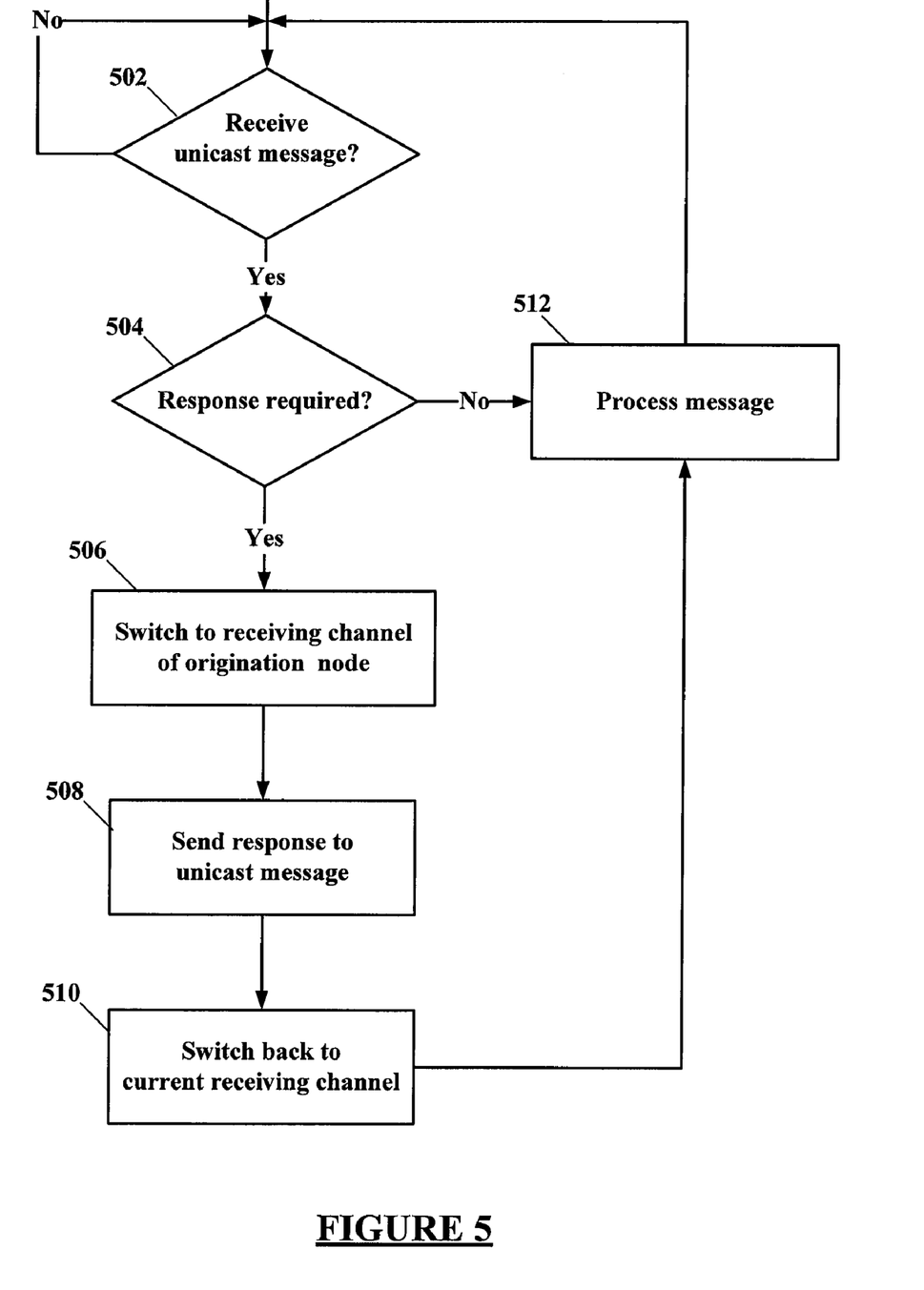
FIG. 5 is a schematic flow diagram for receiving the unicast message as shown FIG. 4, according to the teachings of this disclosure.

Referring to FIG. 5, depicted is a schematic flow diagram for receiving the unicast message as shown in FIG. 4, according to the teachings of this disclosure. In step 502 a determination is made if a unicast message has been received. If so, then in step 504 a determination is made of whether a response to the received unicast message is required. If no response is required, then in step 512 the received unicast message is processed.

However, if a response is required, then in step 506 the destination node switches to the receiving channel of the origination node. Then in step 508 a response is sent to the origination node on its receiving channel. Once this response has been transmitted, the destination node switches back to its receiving channel in step 510 and processes the message in step 512.

Figure 6:
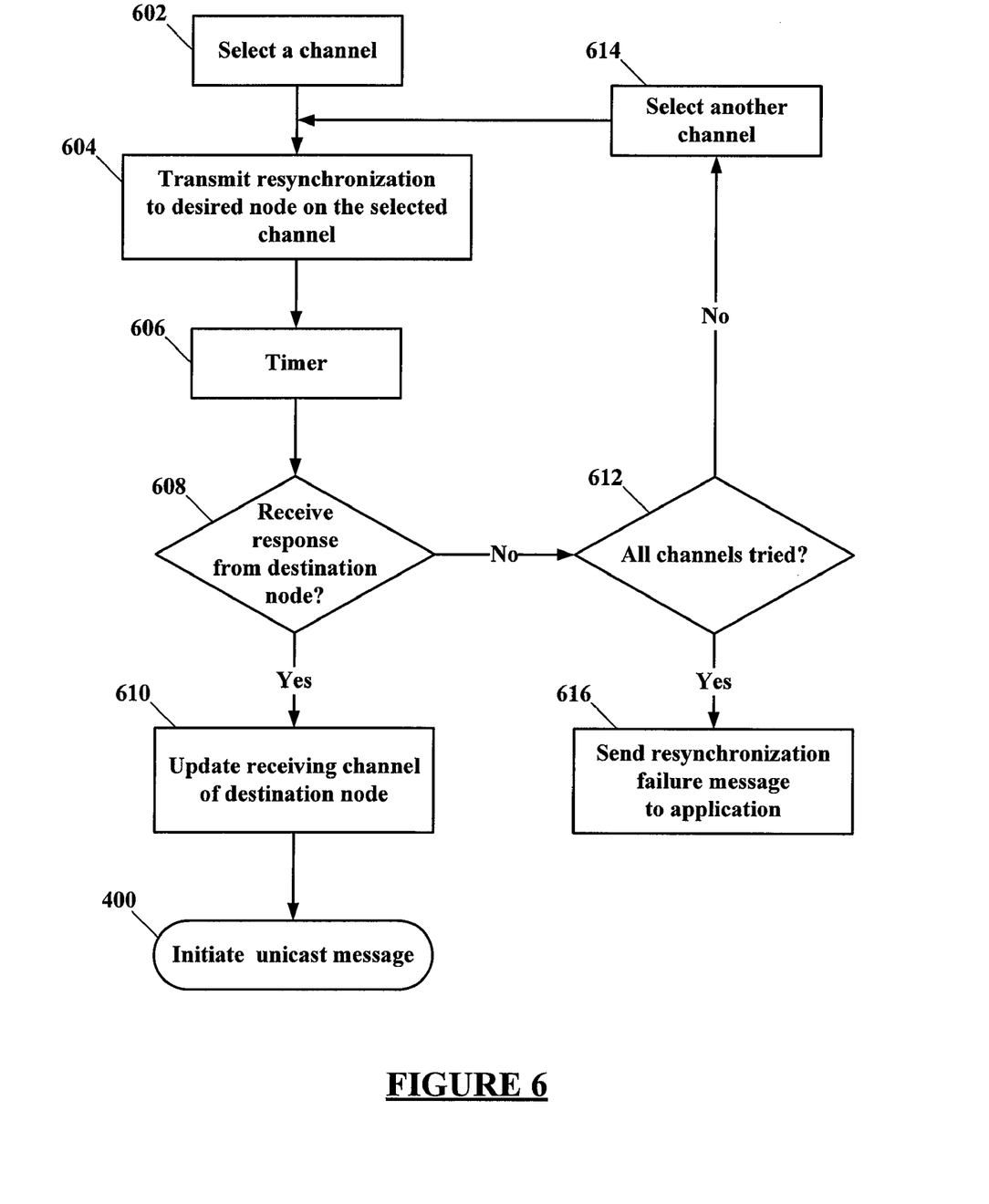
FIG. 6 is a schematic flow diagram for resynchronization of receiving channels of each node, according to the teachings of this disclosure.

Referring to FIG. 6, depicted is a schematic flow diagram for resynchronization of receiving channels of each node, according to the teachings of this disclosure. In step 602 a channel is selected. In step 604 a resynchronization message to a desired node is transmitted on the selected channel. In step 606 a certain time elapses. Then in step 608 determination is made whether a response from the desired node is received. When a response is received, then in step 610 the responding destination node's current receiving channel is updated in the origination node's receiving channel table if it has changed. Then step 400 begins a new unicast message to the desired destination node (see FIG. 4 and description thereof hereinabove).

However, if no response has been received within the certain time, then in step 612 a determination is made whether all channels have been tried. If there are still channels left to be tried, then in step 614 another channel is selected and steps 604 through 608 repeat as described hereinabove. If all channels have been tried and there still has been no response received from the desired node, then in step 616 a resynchronization failure message is sent to the application.

Figure 7:
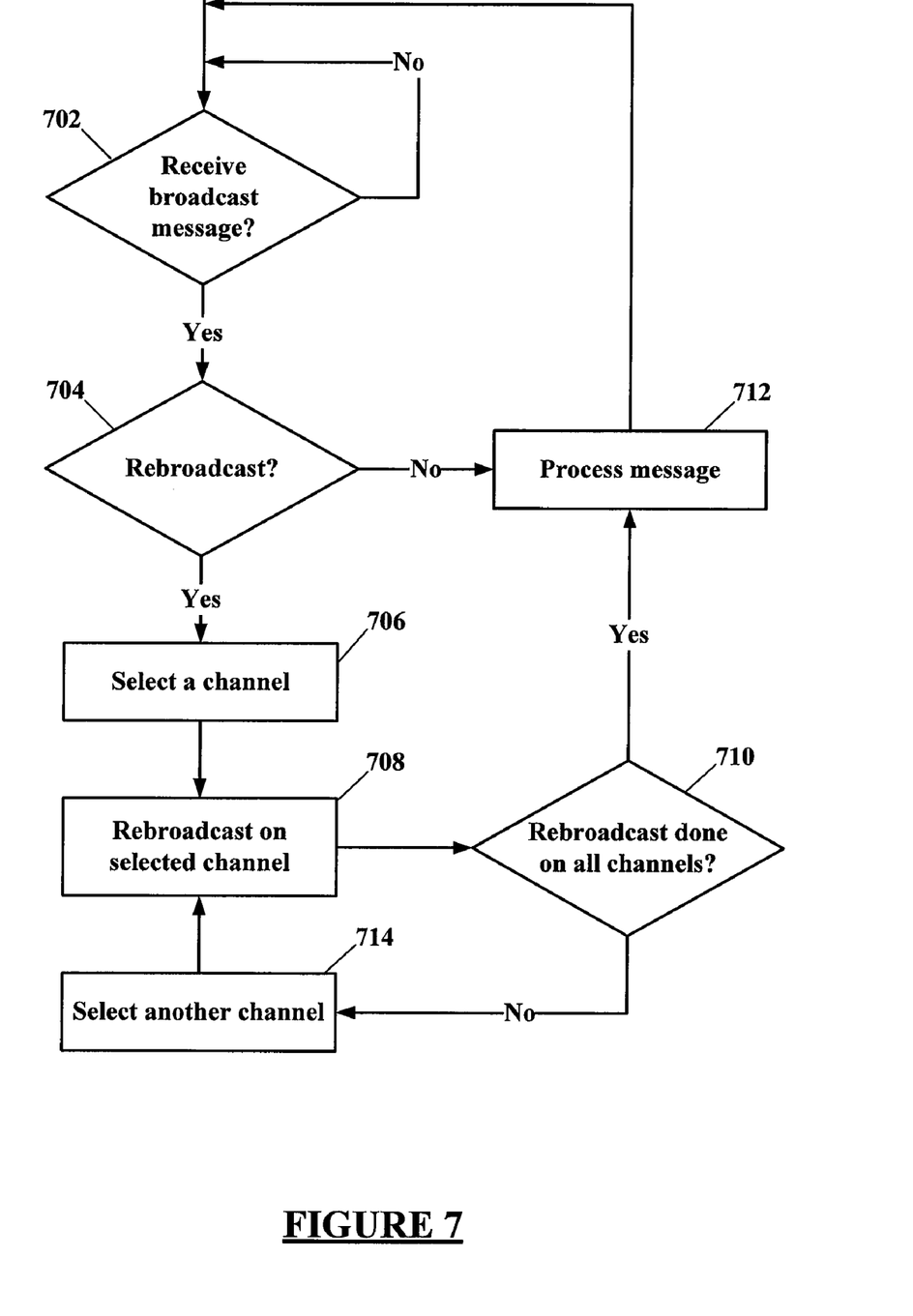
FIG. 7 is a schematic flow diagram for receiving and processing a broadcast message, according to the teachings of this disclosure.

Referring to FIG. 7, depicted is a schematic flow diagram for receiving and processing a broadcast message, according to the teachings of this disclosure. In step 702 a determination is made whether a broadcast message is being received. Then in step 704 a determination is made whether the received broadcast message should be rebroadcast. If the broadcast message is not to be rebroadcast, then in step 712 the message is processed. However, if the broadcast message is to be rebroadcast, then in step 706 a channel is selected, and in step 708 the message is rebroadcast on that channel. In step 710 a determination is made whether the message has been rebroadcast on all channels of the wireless network. If not, then in step 714 another channel is selected, and steps 706 through 710 repeat as described hereinabove. When the message has been rebroadcast on all channels, then in step 712 the message is processed.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method for improving communications range between a plurality of nodes, said method comprising the steps of:
   scanning receiving channels available to a plurality of nodes;
   selecting a receiving channel having a lowest noise or interference level for each one of the plurality of nodes;
   storing each of the selected receiving channels in respective ones of the plurality of nodes;
   a) switching to the receiving channel of a destination node;
   b) including the receiving channel of an origination node in the unicast message to be sent to the destination node;
   c) sending the unicast message to the destination node;
   d) returning to the receiving channel of the origination node;
   e) determining if a response is received from the destination node;
   if the response is received then the unicast message is finished;
   if the response is not received within a certain time then repeating steps a) through e) until the response is received within the certain time; and
   if steps a) through e) are repeated more than a certain number of times then notifying an application of a failure in sending the unicast message;
   determining if the unicast message is being received by the destination node;
   determining whether sending the response is required, wherein if not required, then processing the received unicast message; and
   if required, then switching to the receiving channel of the origination node and sending the response to the origination node;
   switching back to the receiving channel of the destination node; and
   processing the received unicast message.

2. The method according to claim 1, further comprising the step of broadcasting the selected receiving channel for each one of the plurality of nodes to other ones of the plurality of nodes, wherein each one of the plurality of nodes stores the receiving channels of neighbor nodes.

3. The method according to claim 1, further comprising the step of transmitting resynchronization to a destination node comprises the steps of:
   a) selecting a one of the receiving channels;
   b) sending a resynchronization message to a destination node on the selected receiving channel;
   c) determining whether a resynchronization response is received from the destination node, wherein
      if no resynchronization response is received within a certain time, then selecting another one of the receiving channels and repeating steps b) and c) until all of the receiving channels have been selected, and
   alerting a resynchronization failure application if the resynchronization response is not received after all of the receiving channels have been selected;

if the resynchronization response is received within the certain time, then updating the receiving channel of the destination node as an updated receiving channel, and initiating the unicast message on the updated receiving channel of the destination node.

4. The method according to claim 1, further comprising the step of receiving a broadcast message comprises the steps of:

determining whether a broadcast message is being received;

determining whether the received broadcast message is to be rebroadcast, wherein if the received message is not to be rebroadcast then processing the received message, and if the received message is to be rebroadcast then rebroadcasting the received message.

5. The method according to claim 4, further comprising the step of rebroadcasting the received message comprises the steps of:

a) selecting a one of the receiving channels;

b) rebroadcasting the received message on the selected channel;

c) determining whether the received message has been rebroadcast on all of the receiving channels, wherein if the received message has not been rebroadcast on all of the receiving channels then selecting another one of the receiving channels and repeating steps b) and c), and if the received message has been rebroadcast on all of the receiving channels then processing the message.

* * * * *